No. 745,046. PATENTED NOV. 24, 1903.
C. W. FARQUHARSON & O. F. ADELMAN.
MOUNTING FOR THE COILS OF VOLTMETERS OR SIMILAR INSTRUMENTS.
APPLICATION FILED AUG. 3, 1903.

NO MODEL. 2 SHEETS—SHEET 1.

Witnesses. Inventors

No. 745,046. PATENTED NOV. 24, 1903.
C. W. FARQUHARSON & O. F. ADELMAN.
MOUNTING FOR THE COILS OF VOLTMETERS OR SIMILAR INSTRUMENTS.
APPLICATION FILED AUG. 3, 1903.
NO MODEL. 2 SHEETS—SHEET 2.
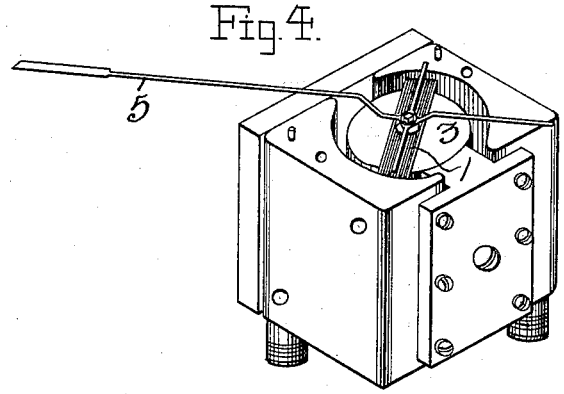
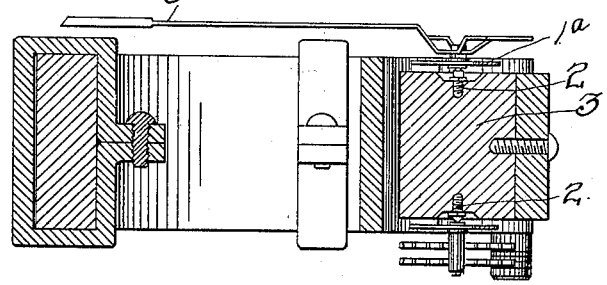
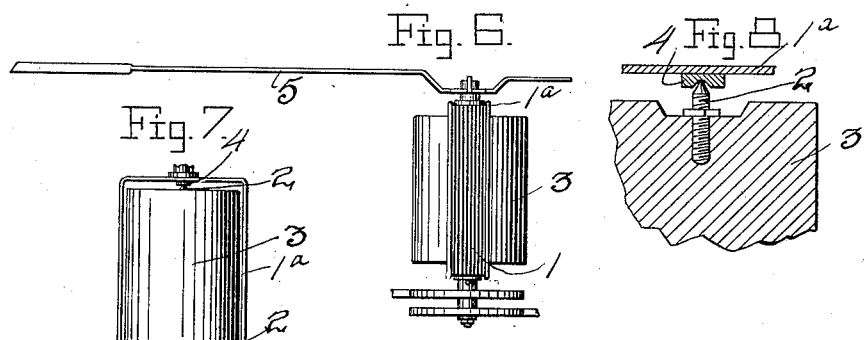
Witnesses.
Inventors
C. W. Farquharson
O. F. Adelman
by
H. B. Willson,
Att'y.

No. 745,046. Patented November 24, 1903.

UNITED STATES PATENT OFFICE.

CHARLES W. FARQUHARSON AND OSCAR F. ADELMAN, OF CHICAGO, ILLINOIS.

MOUNTING FOR THE COILS OF VOLTMETERS OR SIMILAR INSTRUMENTS.

SPECIFICATION forming part of Letters Patent No. 745,046, dated November 24, 1903.

Application filed August 3, 1903. Serial No. 168,109. (No model.)

*To all whom it may concern:*

Be it known that we, CHARLES W. FARQUHARSON and OSCAR F. ADELMAN, citizens of the United States, residing at Chicago, in the county of Cook and State of Illinois, have invented certain new and useful Improvements in Mountings for the Coils of Voltmeters or Similar Instruments; and we do declare the following to be a full, clear, and exact description of the invention, such as will enable others skilled in the art to which it appertains to make and use the same.

Our invention relates to improvements in voltmeters, and has reference particularly to the means for mounting the swinging coil which carries and actuates the pointer; and it consists in the peculiar construction and combination of devices hereinafter described and claimed.

The object of our invention is to effect improvements in the means for mounting the swinging coil, so that the coil will not be affected by magnetic lag and will not cause variations in the strength of the magnet, to the end that the coil will be rendered more sensitive than heretofore and the accuracy of the instrument correspondingly increased.

Figure 1:
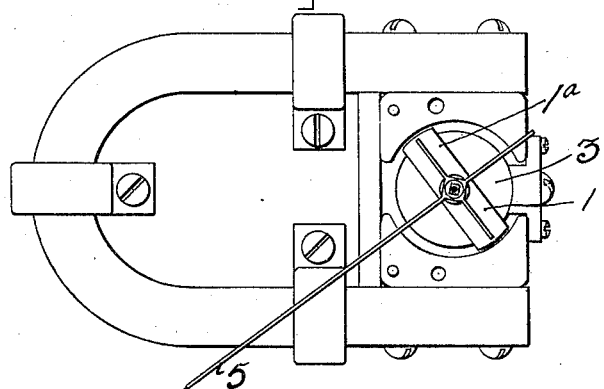
Figure 2:
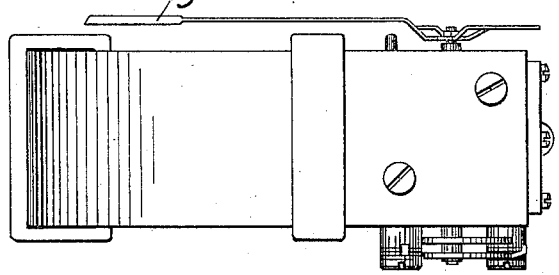
Figure 3:
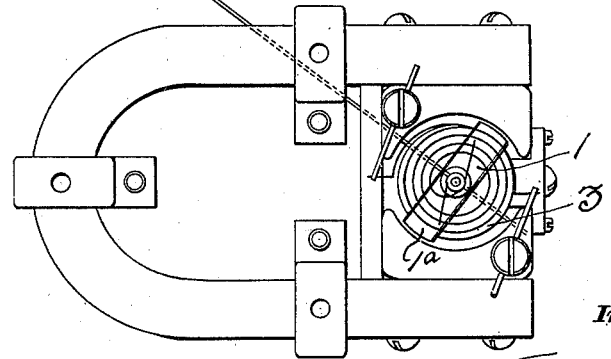

In the accompanying drawings, Figure 1 is a top plan view of a voltmeter embodying our improvements, the scale with which the pointer coacts being omitted. Fig. 2 is a side elevation of the same. Fig. 3 is an inverted plan view of the same. Fig. 4 is a detail perspective view showing the upper bearing for the coil. Fig. 5 is a vertical longitudinal central sectional view of the voltmeter shown in Figs. 1, 2, and 3. Fig. 6 is a detail elevation showing the core, the coil, the bearings for the latter, and the pointer carried and operated by the coil. Fig. 7 is a similar view at right angles to Fig. 6, showing the core, the coil, and the bearings for the latter. Fig. 8 is a detail sectional view, on a larger scale, showing a portion of the core, the coil, and the upper bearing of the latter.

In its general features the voltmeter here shown is of the usual construction well known to those skilled in the art to which our invention relates, and hence the same is not herein particularly described.

In carrying out our invention, which relates solely to the means for mounting the swinging coil 1, so that it will not be subject to magnetic lag, we provide a pair of bearing-pins 2, which are made of hardened steel, are pointed at their outer ends, have their shanks screw-threaded, and screwed firmly into threaded sockets or openings in the ends of the core 3. On the inner sides of the coil-frame 1ª, at the center and ends thereof, we secure jewels 4, which have their bearings on the pointed ends of the pins, so that the coil-frame is mounted to swing on the bearing-pins, which latter are stationary, being secured firmly to the stationary core. Hence in our improved means for mounting the coil-frame there are no movable magnetic elements, and the same are not subject to magnetic lag. The coil is therefore rendered very sensitive and may swing freely as required to move the pointer 5. The movement of the coil does not vary the strength of the magnet, and the accuracy of the instrument is very greatly promoted.

Heretofore, so far as we are aware, instruments of this character have been provided with parts of iron or steel in the mountings of the coil, which magnetic parts move with the coil and are hence subject to magnetic lag and are liable to cause variations in the strength of the magnet in whose magnetic field they are included, thus impairing the accuracy of the instrument. In our improved mountings for the coil the magnetic parts are immovable, and hence we avoid these objections.

We do not desire to limit ourselves to the precise construction and combination of devices herein shown and described, as it is obvious that modifications may be made therein without departing from the spirit of our invention and within the scope of the appended claims.

Having thus described our invention, what we claim, and desire to secure by Letters Patent of the United States, is—

1. An instrument of the class described having mountings for the coil comprising fixed bearing-pins at the ends of the core and jewels secured to the coil-frame, having their bearings on the bearing-pins and movable with the coil-frame.

2. An instrument of the class described having a core provided with fixed bearing-pins, and a coil having bearing elements of non-magnetic material, mounted on the said bearing-pins.

In testimony whereof we have hereunto set our hands in presence of two subscribing witnesses.

CHARLES W. FARQUHARSON.
OSCAR F. ADELMAN.

Witnesses:
GEO. CROCKER,
CHAS. J. MEYERS.